April 30, 1935.                A. LESAGE                1,999,703
FLYWHEEL MAGNETO APPARATUS
Filed Nov. 19, 1932
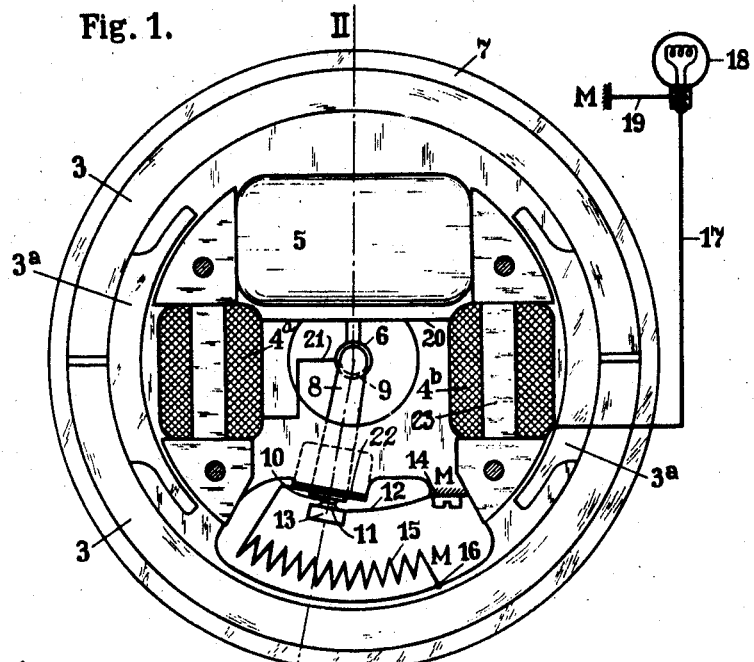
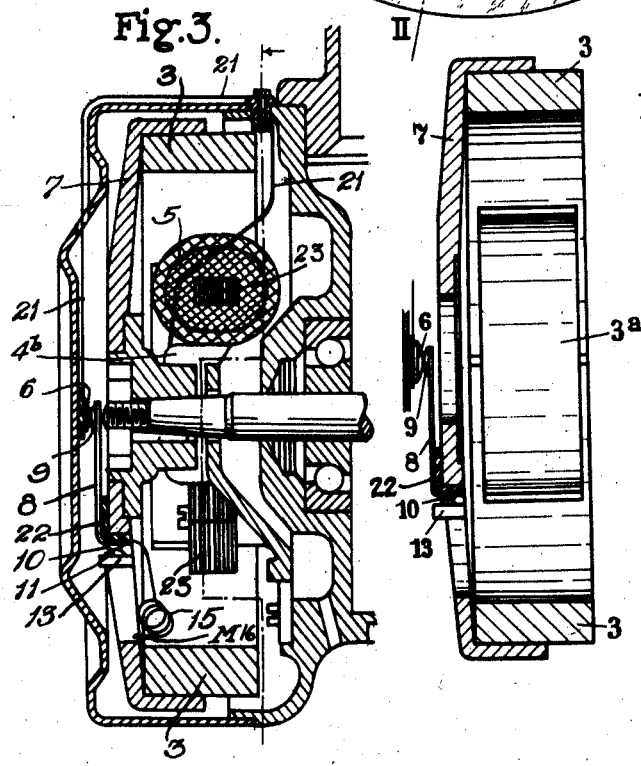
Inventor
Alfred Lesage Patented Apr. 30, 1935

1,999,703

UNITED STATES PATENT OFFICE 1,999,703

FLYWHEEL MAGNETO APPARATUS

Alfred Lesage, Schweinfurt, Germany

Application November 19, 1932, Serial No. 643,328
In Germany November 21, 1931

3 Claims. (Cl. 171—229)

The invention relates to a magneto apparatus mounted on the flywheel of a combustion motor for generating the necessary electric currents for igniting the fuel mixture and for lighting the electric lamps intended to illuminate a motorcycle or similar vehicle upon which the motor is mounted. For this purpose, the magneto is provided with separate coils for generating the illuminating current and the igniting current respectively.

The disadvantage in generators of this type, is that the current produced changes with the speed of the motor so that at too low a speed the lighting power is insufficient, while at high speeds the excessive voltage will injure the filament of the lamp.

In order to remove the drawbacks referred to and to obtain a current of a definite normal or medium voltage, the flywheel magneto, in accordance with the present invention, is provided with a regulating device which includes an electrical resistance in the lighting circuit and a movable fly-weight which, under the influence of centrifugal force, controls a switch in such a way that the electrical resistance is shunted for certain speeds of the motor.

An embodiment of the invention is represented in the annexed drawing, which forms a part of this specification, and in which—

Fig. 1 is a side elevation of a flywheel magneto embodying my invention, and shows certain of the parts thereof in section, Fig. 2 shows a section of certain of the parts taken on the broken line II—II of Fig. 1, and Fig. 3 is a complete section on the line II—II of Fig. 1.

The magneto is housed within the flywheel 7 and mounted with its rotating parts as usually on the shaft of an internal combustion motor (not shown). Its permanent magnets 3 and pole shoes 3a freely rotate about the armature coils 4a and 4b for generating the illuminating current and about a coil 5 for generating the ignition current. The coils 4a, 4b and 5 have a common horseshoe laminated armature core 23 as shown. The coils 4a and 4b are connected with one another by a wire 20 and together with the coil 5 mounted on the stationary base plate of the magneto. One end of the winding of the coil 4a is connected by means of a wire 21 to a contact 6 suitably insulated and arranged, e. g., in the center of an internal face of the casing enclosing the magneto. A spring brush 8 mounted by means of an insulating block 22 on the rotating flywheel is provided at its free end with a contact piece 9 bearing against said contact 6. The other end of the spring brush 8 carries a contact piece 10 against which a counter-contact piece 11 is pressed when the motor is idling or is operating at low speeds, said contact piece 11 being connected to the free end of a leaf spring 12 which also carries at this free end a flyweight 13, the other end of the spring 12 being fastened at 14 to the body of the flywheel 7. Connected to the contact piece 10 is one end of a resistance coil 15, the other end of which is connected to the body of the flywheel at 16. This resistance may be given any well known shape and is suitably secured for rotation with the flywheel. The coil 4b is connected to a wire 17 leading to one terminal of the incandescent lamp 18, the other terminal of which is connected by a wire 19 to the motor so that the circuit is closed through the body of the machine. Within the circuit switches or other apparatus may be arranged as may be required.

The device works as follows. The winding of the armature coils 4a and 4b is so chosen that the voltage produced corresponds to the lamp voltage at the regular cruising speeds of the motor. At these speeds the elastic pressure of the spring 12 is sufficient to overcome the centrifugal force of the fly-weight 13, and to maintain the contact pieces 10, 11 together. Under these conditions, the current flows from the coils 4a and 4b, through the contact pieces 6 and 9, and through the insulated spring brush 8, the contacting point 10, 11 and the spring 12 to the body M of the machine at 14. The wire 19 connected at another point to the machine body ends at one terminal of the lamp socket so that the current returns from the other terminal of the lamp 18 through the wire 17 to the coil 4b. At higher speeds of the motor, when the voltage of the illuminating circuit is increased, the centrifugal force acting on the weight 13 will be correspondingly increased until the spring 12 is bent outwards by the fly-weight 13, thereby interrupting the contact between the pieces 10 and 11. Then the current will flow from the contact piece 10 through the resistance coil and from there to the body M of the machine, as before. In this way the voltage will be reduced to the medium amount desired. The spring 12 will automatically close the contact point 10, 11 as soon as the speed of the motor has dropped to normal cruising speed. By means of my improved construction the voltage of the lamp varies within narrow limits only and the switching is done automatically at the various speeds.

The spring 12 may be replaced by a lever pivotally mounted and which is controlled by a spring and arranged for moving the contact.

What I claim is—

1. A flywheel magneto for generating electric currents for the illuminating circuit of a vehicle, including a permanent magnet attached to the flywheel, stationary armature windings between the poles of said magnet, a resistance in the circuit of said windings and rotating with said flywheel, a shunt across said resistance, and including a switch, and means automatically operable upon the speed of rotation of the magneto exceeding a predetermined amount for opening said switch.

2. A flywheel magneto for generating electric currents for the illuminating circuit of a vehicle, including a permanent magnet attached to the flywheel, stationary armature windings between the poles of said magnet, a resistance in said illuminating circuit and rotating with said flywheel, a shunt across said resistance and including a switch having a pair of contact pieces, spring means for urging said switch in closed position, a fly-weight rotatable with said flywheel and connected for switch opening movement with one of said contact pieces to open said switch against the action of said spring means when the speed of rotation of said flywheel exceeds a predetermined amount, a stationary contact in the circuit of said windings, and a brush connected to said flywheel and electrically interconnecting said stationary contact with the other switch contact piece.

3. A flywheel magneto for generating electric current for the illuminating circuit of a vehicle, including a stationary casing, a permanent magnet connected for rotation with the flywheel, stationary armature windings, a resistance in said illuminating circuit connected for rotation with said flywheel, a shunt across said resistance and including a leaf spring rotatable with said flywheel, and a switch having a pair of contact pieces one of which is connected to said spring, a fly-weight connected to said spring for separating said contact pieces under the action of centrifugal force, whereby said circuit is opened when the speed of rotation of said flywheel exceeds a predetermined amount, a stationary contact in the circuit of said winding and attached to the casing in axial relationship with said flywheel, and a brush fixed to said flywheel and electrically interconnecting said contact with the other contact piece of said switch.

ALFRED LESAGE.